United States Patent [19]
Brown

[11] Patent Number: 5,568,610
[45] Date of Patent: Oct. 22, 1996

[54] METHOD AND APPARATUS FOR DETECTING THE INSERTION OR REMOVAL OF EXPANSION CARDS USING CAPACITIVE SENSING

[75] Inventor: Alan E. Brown, Georgetown, Tex.

[73] Assignee: Dell USA, L.P., Austin, Tex.

[21] Appl. No.: 441,485

[22] Filed: May 15, 1995

[51] Int. Cl.$^6$ ................................................. G06F 11/34
[52] U.S. Cl. ..................... 395/185.01; 395/282; 439/955
[58] Field of Search .................................. 395/180, 182.2, 395/325, 185.01, 282; 307/31, 66, 46, 85; 439/489, 911, 955

[56] References Cited

U.S. PATENT DOCUMENTS

| | | | |
|---|---|---|---|
| 4,401,358 | 8/1983 | Daigaku | 439/955 |
| 4,507,697 | 3/1985 | Ozil et al. | 439/955 |
| 4,747,783 | 5/1988 | Bellamy et al. | 439/59 |
| 5,021,679 | 6/1991 | Fairbanks et al. | 307/66 |
| 5,184,025 | 2/1993 | McCurry et al. | 307/66 |
| 5,287,217 | 11/1993 | Kobayashi et al. | 265/228 |
| 5,317,697 | 5/1994 | Hurst et al. | 395/325 |
| 5,390,081 | 2/1995 | St. Pierre | 361/775 |
| 5,432,716 | 7/1995 | Hahn et al. | 395/325 |
| 5,451,763 | 9/1995 | Pickett et al. | 235/492 |

Primary Examiner—Robert W. Beausoliel, Jr.
Assistant Examiner—Albert Décady
Attorney, Agent, or Firm—Henry N. Garrana; Mark P. Kahler; Michelle M. Turner

[57] ABSTRACT

A detection system for detecting the insertion or removal of expansion cards having a standard edge connector using one or more capacitive plates coupled to corresponding variable frequency oscillators. The capacitive plates are preferably mounted on an internal layer of the expansion card and preferably aligned with corresponding pins of the edge connector for establishing capacitive loading with respect to the corresponding pins. The frequency of the oscillators change with changes in the capacitive loading of the corresponding plates. The detection circuitry includes a processor which continuously monitors the frequency of the oscillators to thereby detect movement of the expansion card, and preferably includes a control and isolation circuit which electrically isolates the power and data pins during insertion and/or removal as controlled by the processor. The detection circuitry may be mounted to either on the expansion card or the planar of the computer system. If mounted on the expansion card, the power and data pins are in a tristated condition while the option card is removed from the planar. The processor detects that the expansion card is being inserted or removed when the frequency of one or both oscillators is at a predetermined frequency or shifts by a predetermined amount.

28 Claims, 3 Drawing Sheets

METHOD AND APPARATUS FOR DETECTING THE INSERTION OR REMOVAL OF EXPANSION CARDS USING CAPACITIVE SENSING

FIELD OF THE INVENTION

The present invention relates to detection of expansion cards of a computer system, and more particularly to detection of insertion or removal of expansion cards through capacitive sensing while system power is applied.

DESCRIPTION OF THE RELATED ART

Most personal computers today include an input/output (I/O) bus, such as the integrated system architecture (ISA), the extended-ISA (EISA), the peripheral component interconnect (PCI), among others, for receiving option or expansion cards to add functions and capabilities to the base system. Traditionally, such expansion cards were not necessarily intended to be inserted or removed from the system while power is applied. The user of the computer system was typically advised to shut down the computer, remove the cover and insert or otherwise remove an expansion card before reinstalling the cover and applying power. Thus, it was generally assumed that any expansion cards were inserted prior to power-up and that these cards remained connected during normal operation.

Of course, expansion cards sometimes fail and require replacement. A user may want to remove a card that is no longer being used or insert a new card to add one or more functions. The primary problem with insertion or removal of expansion cards under power is that the electrical specifications were not specifically designed for this capability. Corresponding connector pins of each slot are electrically coupled together so that sudden electrical changes tend to affect the remaining expansion cards plugged into the I/O bus. In particular, an installed expansion card may be asserting or de-asserting signals on the card edge pins or providing capacitive loading, so that sudden removal may cause data glitches causing erroneous operation. Insertion of a "cold" expansion card could also cause data glitches possibly affecting the computer and/or other expansion cards. For example, an expansion card deriving power from the I/O bus could cause a sudden power surge or drain when plugged into a "hot" connector, which could adversely affect the computer system and/or other expansion cards.

There are certain situations where it is desirable to maintain system power while adding, removing, or otherwise swapping expansion cards. It is known, for example, that users often ignore standard procedure and attempt insertion and/or removal regardless of potentially negative consequences. Thus, "hot swapping" of expansion cards is generally considered desirable. The primary need for hot insertion or removal is in server systems where it is very inconvenient to shut down the computer system. The system administrator must first warn all users to log off or otherwise save data prior to shutdown. The system administrator must then shut down the system, insert, remove or otherwise replace the expansion cards and then power up the system. Such interruption is not only inconvenient for the system administrator, but is also inconvenient for all users of the system, who lose access to the system facilities during shutdown.

The PC Card developed by the Personal Computer Memory Card International Association (PCMCIA) or the Japan Electronics Industry Development Association (JEIDA) includes the capability to be inserted or removed while power is applied. In particular, two card detection signals provide a method of notifying the host system when the PC Card has either been inserted or removed. However, the PC Card is not designed to be removed while being accessed or otherwise operated. The detection pins merely inform the computer that the PC Card is plugged in or not, but does not inform the computer that it is moving or in the process of insertion or removal.

Interfacing circuitry is necessary to electrically isolate the logic and power signals before hot-swapping is feasible. However, some means of detecting the movement of the expansion card during removal or insertion is needed to activate the isolation circuitry. Electro-mechanical sensing methods are not reliable due to the nature of the standard card edge connector. Such methods usually require modification of the standard card edge connector, which is not reliable nor cost-effective in general.

A system developed by Tricord Systems provides a capability for swapping expansion cards during a power on condition. However, this method requires an operator to intervene before and after the insertion or removal of the expansion card. The operator asserts a command to tristate the data signals and remove power to the expansion card to allow for a smooth card swap. Once the card is inserted or otherwise removed, the operator asserts a command to allow normal operation. This method is not automatic and exposes the system to operator error which could otherwise cause a soft or even hard failure of the system.

It is therefore desired to provide an automatic detection of the movement of expansion cards and to automatically perform the necessary procedures to facilitate the insertion or removal of the expansion card under power.

SUMMARY OF THE INVENTION

A detection system according to the present invention senses movement of an expansion card relative to an input/output (I/O) connector of the main system board or planar using a capacitive sensing method and alerts a control circuit to perform desired functions to facilitate smooth electrical transition. The control circuit performs the desired connection or disconnection functions, including isolating or tristating power and data pins, to facilitate insertion and removal of the expansion card without undesirable power surges and/or electrical glitches.

The detection system preferably includes at least one variable frequency oscillator which has a frequency that varies with changes of its input capacitance. The oscillator is very simple and inexpensive and is preferably implemented using an inverter having a high input impedance and a feedback resistor, which exhibits adequate sensitivity for sensing input capacitive loading changes. For example, the inverter may be a CMOS Schmitt trigger inverter or like. The capacitor is preferably a conductive plate formed on the outer layer between pins or on an inner layer of the edge connector, which is capacitively coupled with respect to an associated connector pin on the I/O bus connector. The plate exhibits relatively high capacitive coupling when the expansion card is fully inserted into the planar connector, where the capacitive coupling decreases while the card is pulled from the connector. The frequency of the oscillator changes with changes of capacitive coupling of the plate. For example, the frequency may initially be relatively high when the card is plugged into the planar connector. When a user begins to pull the card from the planar conductor, the capacitive coupling of the plate decreases causing the oscillator to increase its frequency.

A processor continuously monitors the frequency of the oscillator and determines insertion or removal based on the oscillation frequency. The processor informs a control circuit of the status of the expansion card, where the control circuit then performs the necessary electrical isolation of power and data signals to facilitate a smooth electrical transition.

The capacitive plate is predominantly rectangular, but also includes a slanted edge so that the plate gets narrower towards the outer edge of the card connector. This facilitates an increased change of capacitive coupling during movement and thus allows the control circuit to more easily detect expansion card movement. Further, two separate plates are provided on the opposite ends of the connector and connected to corresponding oscillators to assure detection in the event of pivotal movement, which might not otherwise be detectable with a single plate/oscillator since some pins might be disconnected while others remain connected. The processor continually monitors both oscillator circuits to determine the connection status. Thus, if the frequency of either oscillator shifts by a predetermined amount or reaches a predetermined frequency, removal is detected before disconnection of any pins occurs.

One or both of the capacitive plates may alternatively be placed on the outer surface of the expansion card edge connector but located between adjacent pins. One or both of the pins on the planar I/O connector corresponding to the adjacent pins of the edge connector is either grounded or capacitively coupled to ground to facilitate capacitive detection. The latter alternative of capacitive coupling is achieved by connecting a capacitor between the pin and ground, and is used when the pin is used as a data pin rather than a ground pin. It is noted that many variations are possible regarding the capacitive plates. For example, a capacitive plate could be mounted on an inner layer and yet aligned between adjacent pins, as long as sufficient capacitive coupling is achieved when the expansion card is plugged into the I/O slot.

The detection circuit is either implemented on the planar of the computer system or resident on the expansion card itself. If on the expansion card, the power and data pins of the expansion card are tristated or otherwise isolated until connection to power is detected. A detection circuit preferably detects the connection to the computer I/O slot and asserts a signal to the control circuit. The expansion card is then powered up and the data pins of the card are released from tristate condition to allow communication with the pins of the I/O connector of the planar. Such power up may be implemented in a variety of ways, such as waiting a predetermined period or ramping up supply voltage at a predetermined rate. When subsequent movement is detected indicating removal of the expansion card, shut-down procedures, if any, are immediately performed and the power and data pins of the expansion card are tristated by the control circuit. Thus, the expansion card is powered down before electrical disconnection of any pin occurs. This assures smooth electrical transition during removal of the expansion card.

If the detection circuitry is located on the planar, a detection circuit is preferably placed between the power signal from the planar and the power pins of the expansion card. The detection circuit may be a high impedance current detect circuit for sensing current draw from the expansion card. The data pins are tristated. In this manner, power surges and data glitches are avoided during insertion. In one embodiment, a current detect circuit determines connection when current through the high impedance path is detected, and the high-impedance path is then bypassed to allow the expansion card to power-up. Again, power up may be immediate, delayed or controlled at a certain rate. Eventually, the data pins are also released from the tristate condition.

In an alternative embodiment, the detection circuit is not necessary since the processor maintains isolation until the frequency of both oscillators reaches a predetermined frequency or shifts by a predetermined amount assuring full connection of the expansion card. When a user starts to remove the expansion card, the processor detects the frequency change of either or both oscillators and commands the control circuit to remove power and tristate the data pins.

It is appreciated that an automatic detection method according to the present invention allows hot-swapping of expansion cards while system power remains on. This is particularly advantageous in server systems where it is very inconvenient to shut down the system to remove, insert, or otherwise replace expansion cards at the system level.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
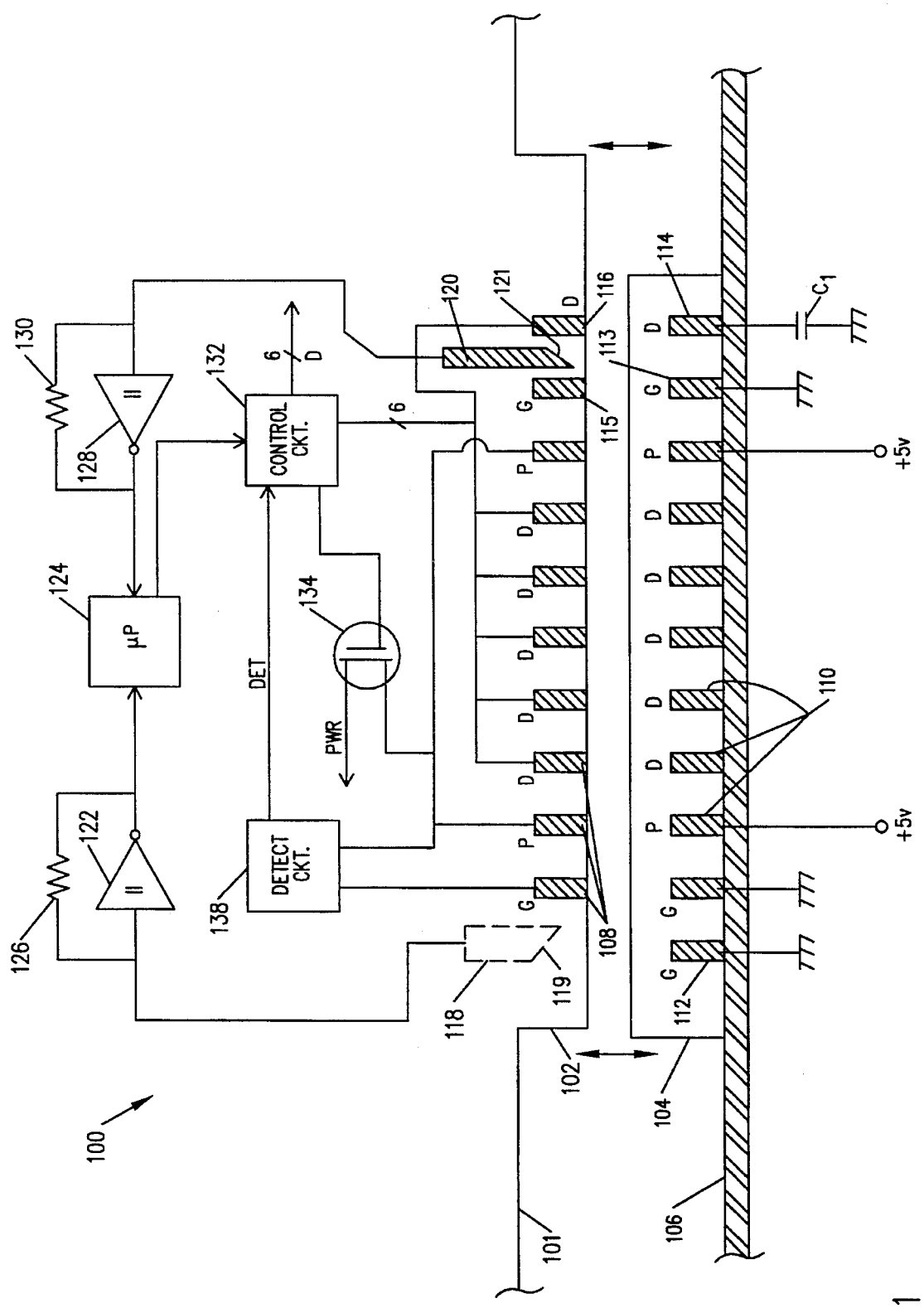
FIG. 1 is a partial side view and schematic of an expansion card according to the present invention for mounting to an I/O bus connector of a computer system.

Referring now to FIG. 1, a side view and partial schematic and block diagram is shown of a detection circuit 100 according to the present invention. In this embodiment, the primary portion of the detection circuit 100 is implemented on an expansion card 101, which is adapted for mating to a corresponding connector 104 mounted to a planar 106 of a computer system. The expansion card 101 is preferably a multi-layer printed circuit board (PCB) including a standard edge connector 102 having an outer surface etched with a plurality of conductive pins 108. The pins 108 of the expansion card 101 interface or otherwise electrically connect to corresponding conductive pins 110 within the connector 104.

In the preferred embodiment, the computer is an IBM-compatible personal computer system where the connector 104 is a slot of an input/output (I/O) bus, such as the industry standard architecture (ISA), the extended ISA (EISA), or the peripheral component interconnect (PCI) or the like. The figures only show a representative portion of the pins of an actual connector. An ISA bus connector, for example, includes a total of 98 pins, 49 pins on each side of the connector 102, and further includes a slot for dividing the 8-bit portion from the 16-bit portion as known to those skilled in the art.

The pins 108, 110 have particular assignments depending upon the functions performed on the expansion card 101. In particular, the pins 108, 110 are generally either ground pins denoted by the letter G, power pins denoted by the letter P, or data pins denoted by the letter D, although other functions and combinations thereof are contemplated. For example, the leftmost pin 112 of the connector 104 showing FIG. 1 is a ground pin connected to chassis ground of the computer system. Two power pins are connected to a power signal, such as a five volt signal referred to as +5 V, for providing power to the expansion card 101 when plugged into the connector 104. Data pins carry data signals between the planar 106 and the expansion card 101 for performing any desired functions.

The left-most pin location of the edge connector 102 corresponding to the pin 112 on the connector 104 does not include a pin. Instead, a metal plate 118 is preferably formed or otherwise routed with a conductive material on the next inner layer of the PCB for establishing capacitive coupling with the ground pin 112 when the expansion card 101 is plugged into the connector 104. The plate 118 is aligned substantially parallel with the outer surface of the connector 102 and parallel with the pin 112 when the expansion card 101 is plugged into the connector 104. The plate 118 is primarily rectangular in shape, but also includes a slanted edge 119 for increasing the capacitive coupling between the plate 118 and pin 112 at a faster rate while the edge connector 102 is inserted into the connector 104 and for decreasing the capacitive coupling at a faster rate while the expansion card 101 is being removed. In this manner, the capacitance of the plate 118 relative to the pin 112 is substantially varied while the expansion card 101 is being inserted or otherwise removed from the connector 104.

Another conductive plate 120 is provided on the opposite end of the connector 102. The plate 120 is very similar to the plate 118 and could be formed on the next inner layer and similarly positioned in parallel fashion for establishing capacitive coupling with a right-most pin 114 of the connector 104 when the expansion card 101 is plugged into the connector 104. For purposes of illustrating an optional and alternative embodiment, however, the plate 120 is mounted to the outer surface of the connector 102 and placed between the two right-most pins 115.116 of the connector 102. This embodiment is used if the right-most pins 114, 116 are data pins where a plate mounted on an internal layer behind the pin 116 might not exhibit sufficient capacitive coupling with the pin 114.

The plate 120 includes a slanted edge 121 for performing a similar capacitive variation function as the slanted edge 119. The plate 120 capacitively couples with the ground pin 113 if the pins 113 and 115 are ground pins. Alternatively, the plate 120 capacitively couples with the data pin 114 of the connector 104 if a capacitor C1 is coupled between the data pin 114 and ground. The capacitor C1 serves to capacitively couple the pin 114 to ground, thus serving as a virtual ground pin for purposes of capacitive sensing. Also, the capacitor C1 provides DC isolation to allow pin 114 to serve as a data pin during normal operation. The capacitor C1 preferably has several times the natural capacitance between the plate 120 and the pin 114, such as 220 pF (picofarad). The present capacitive sensing method works with any of the embodiments described. Thus, the plate may be mounted at convenient locations between pins or aligned behind pins on the next PCB layer, for capacitively coupling with ground pins and/or data pins.

The plate 118 is electrically connected to the input of an inverter 122, which is preferably a Schmitt trigger inverter, such as the 74HC14. The output of the inverter 122 is coupled to a processor device 124, which calculates the frequency asserted by the inverter 122. The processor 124 is any type of suitable microcontroller or microprocessor device capable of determining frequency of an input oscillating digital signal. A feedback resistor 126 is coupled between the input and output of the inverter 122. In a similar manner, the plate 120 is electrically connected to the input of another inverter 128, having its output connected to the processor 124 and having a feedback resistor 130 connected between its input and output. The inverter 128 is preferably the same Schmitt trigger type as the inverter 122. While the expansion card 101 is plugged into the connector 104 and powered on, the plates 118, 120 are capacitively coupled with corresponding pins 112, 114, respectively. The capacitance of the plates 118, 120 is several picofarads on the order of 10–50 pF, for example. The resistors 126, 130 are preferably fairly large, such as 820 kilo-ohms (kΩ) in the preferred embodiment.

The inverters 122 and 128 both operate as variable frequency oscillators, having a frequency directly dependent upon the capacitance of the plates 118, 120 and the resistance of the resistors 126, 130. The frequency of the inverters 122, 128 preferably ranges between approximately 40 kHz to 1.5 MHz depending upon the capacitive loading of the plates 118, 120. Other suitable oscillating circuits are contemplated having frequencies which vary with input capacitance. The inverters 122, 128 could be any inverter having a high input impedance characteristic. Alternatively, lower input impedance inverters could be used, although the resistance of the resistors 126, 130 would be appropriately modified to achieve desired oscillation. Other oscillator circuits are contemplated as well, such as the use of 555 timers and the like, having a frequency of oscillation based on an input capacitance.

The control circuit 132 is preferably coupled to the data pins of the expansion card 101 for electrically isolating or tristating the data pins from remaining circuitry of the expansion card 101. Such isolation allows the data pins of the expansion card 101 to be electrically connected to the corresponding data pins of the connector 104 without data glitches. The control circuit 132 electrically connects the data pins of the expansion card 101 after it is inserted into the connector 104. Such signal isolation circuitry is implemented in any one of several known methods, such as the open collector of bipolar transistors or the high impedance current paths of field-effect transistors (FETs).

The power pins of the edge connector 102 are connected to one side of the current path of a transistor 134, which is preferably a field-effect transistor (FET). In particular, the drain of the FET 134 is connected to the power pins, where its source provides a signal PWR for providing power to various components of the expansion card 101 when the FET 134 is activated or turned on. The gate of the FET 134 receives an enable signal from a control circuit 132, which is further controlled by the processor 124. Several FETs connected in parallel may be necessary depending upon the power requirements of the expansion card 101 as well as heat dissipation considerations. Also, other electrically isolating devices could be used rather than one or more FETs. It is noted that the power pins of the expansion card 101 may be electrically isolated in the same manner as the data pins, except that one or more FETs are preferably used because of higher current needs of power pins.

An insertion detection circuit 138 is preferably coupled between at least one ground pin and at least one power pin of the edge connector 102 of the expansion card 101. The insertion detection circuit 138 is either a voltage or current detection circuit for detecting the +5 V signal indicating that the expansion card 101 has been or is being connected to the connector 104. The insertion detection circuit 138 asserts a signal DET to the control circuit 132 when connection is detected.

Operation of the isolation circuit 100 shown in FIG. 1 is now described. When the expansion card 101 is not inserted into the connector 104, it is generally powered off and the control circuit 132 functions to keep the data pins in a tristate condition with respect to components and circuitry on the expansion card 101. Furthermore, the power pins along the edge connector 102 are isolated from the remaining circuitry of the expansion card 101 through the FET 134. Generally, the remaining components, including the inverters 122, 128 and the processor 124 are powered off. It is contemplated that the expansion card 101 may be separately powered by a battery and always be all or partially powered up. Operation in that case would be substantially the same with only slight variation.

Since the data and power pins of the expansion card 101 are tristated or otherwise isolated, they do not effect the power and ground pins of the connector 104 when the edge connector 102 is plugged into the connector 104. In this manner, the expansion card 101 can be plugged into the connector 104 while the planar 106 is powered on with virtually no practical effect on the circuitry of the planar 106 or other expansion cards plugged into adjacent slots of the I/O bus of the computer system. While the expansion card 101 is being inserted into the connector 104, the insertion detection circuit 138 detects voltage or current flow between the power and ground pins of the edge connector 102, and correspondingly asserts the DET signal.

The control circuit 132 responds in any desired or acceptable manner, such as delaying a predetermined time period to prevent premature connection in the event power connection is only momentary, but eventually activates the FET 134 to provide the power signal PWR to the remaining components of the expansion card 101. Such activation could also be facilitated by use of a ramp up function, where the control circuit 132 ramps up the voltage of the PWR signal in a controlled fashion. The control circuit 132 preferably includes circuitry for this purpose, but could also be connected to the power and ground pins to derive separate power to activate the FET 134. The control circuit 132 could also release the data pins to allow immediate communication with the computer system. However, the control circuit 132 preferably waits for the processor 124 to indicate stable operation before releasing the data pins from tristate. In particular, after the FET 134 is tuned on, the processor 124 powers up, reviews the frequencies of the inverters 122, 128 to verify that the expansion card 101 is fully connected to the connector 104 and stabilized. When the processor 124 detects that the inverters 122, 128 are both oscillating at or near a predetermined frequency level, such as below 100 kHz, it commands the control circuit 132 to release the data pins.

In the preferred embodiment, when the expansion card 101 is plugged into the connector 104 and operating, the capacitive plates 118 and 120 are capacitively coupled and cause the CMOS Schmitt trigger inverters 122, 128 to oscillate at a frequency of approximately 40 kHz. The processor 124 continuously monitors the frequency of the inverters 122, 128 using any one of several known methods. Preferably, the processor 124 continuously counts the number of cycles asserted by the inverters 122, 128 in a predetermined time period. When a user begins to pull the expansion card 101 from the connector 104. The plates 118, 120 become less capacitively coupled with respect to the corresponding pins 112, 114, causing a change of the frequency of the inverters 122, 128. In fact, the frequency of the inverters 122, 128 can become as high as 1.43 MHz when fully unloaded or when the expansion card 101 is almost completely removed from the connector 104. In this manner, even slight movements of the expansion card 101 are detected by the processor 124, since slight movements cause relatively large changes in frequency.

The processor 124 prepares to shut down the expansion card 101 in the event it detects a predetermined amount of frequency change of either the inverter 122 or the inverter 128 or both. For example, a frequency change of a factor often (10) could be used to indicate removal, where the frequency of either one or both of the inverters 122, 128 is approximately 400–500 kHz. If the connector embodiments were mechanically fashioned with very minimal pivotal motion during insertion and removal, a single oscillator circuit and capacitive loading plate could be used. The single plate could be placed anywhere along the edge connector of the expansion card, but would most likely be placed near the center for maximum detection efficiency. Although a single oscillator may suffice in certain embodiments, two separate oscillators detecting movement on either end of the edge connector 102 is preferred, due to the physical constraints of the standard edge connector 102. For example, the user can pull one side completely out of the connector 104, while some pins on the opposite side are still electrically connected.

The processor 124 detects removal of the expansion card 101 when either one or both of the inverters 122, 128 have a substantial shift in frequency. It is noted that slight experimentation is necessary to determine the appropriate change of frequency to indicate when the expansion card 101 is being removed depending on the particular implementation. Slight shifts or adjustments of the expansion card 101 might cause changes in the frequency of the inverters 122, 128, although it would not be desirable to shut down the expansion card 101 in the event of minor frequency shifts. When the frequency of either of the inverters 122, 128 change by a certain predetermined amount, then the processor 124 commences shut down operations.

It is noted that several variations are possible for detecting insertion or removal. Certain absolute low and high frequencies could be ascertained for identifying insertion and removal. Alternatively, certain shifts or changes in frequency could also be ascertained for identifying movement associated with insertion and removal. It is further contemplated that the expansion card 101 include extra logic circuits or that the processor 124 be programmed to perform fuzzy logic techniques for learning capacitive coupling limits and frequency shifts of the oscillators for identifying insertion and removal. These alternative embodiments illustrate that the present invention is very flexible and not limited to any particular implementation.

To shut down the expansion card 101, the processor 124 immediately indicates to the control circuit 132 that shutdown is desired. The control circuit 132 performs whatever operations are necessary to avoid data loss if desired. Such operations would need to be performed quickly to assure subsequent isolation of the connector pins prior to disconnection. Eventually, the control circuit 132 tristates the data pins of the connector 102 while all of the data pins are still in electrical contact with the data pins of the connector 104. Furthermore, the control circuit 132 turns off the FET 134 while all of the power and ground pins of the edge connector 102 are still connected to the power and ground pins of the edge connector 104. In this manner, prior to the pins 108 of the edge connector 102 being disconnected from the corresponding pins 110 of the connector 104, the expansion card 101 tristates all of its data pins and isolates its power pins to enable a smooth electrical transition. In this manner, while the expansion card 101 is being removed from the connector 104 and after such removal, negligible electrical consequences result since the data pins and power pins are no longer drawing or providing significant current, thereby preventing power surges and/or data glitches.

Figure 2:
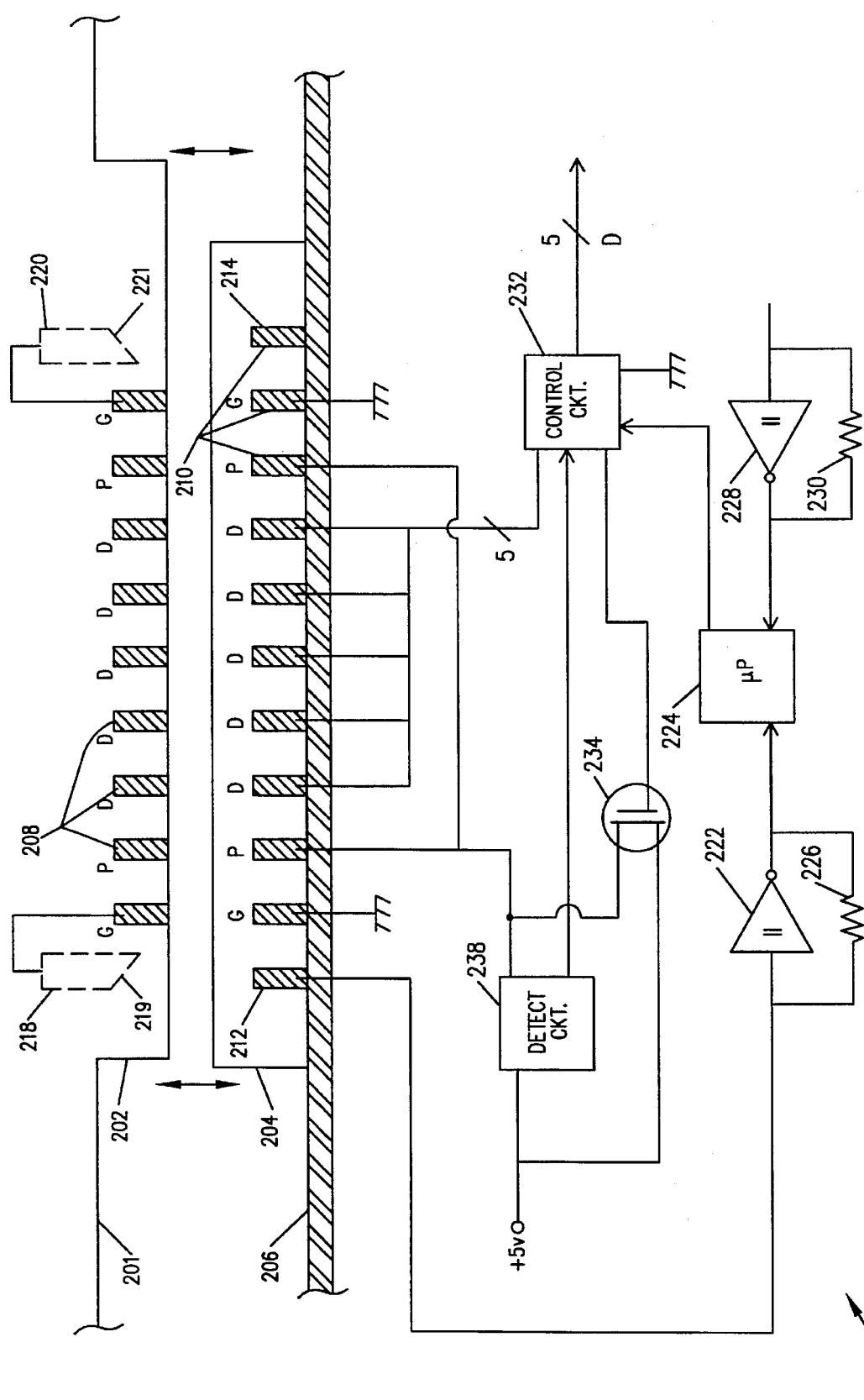
FIG. 2 is a side view and schematic of an expansion card for mounting to the I/O bus connector according to another embodiment of the present invention.

Referring now to FIG. 2, another detection circuit 200 is shown according to an alternative embodiment of the present invention. In this embodiment, the primary portion of the detection circuit 200 is located on a planar 206 of the computer system, rather than being located on an expansion card 201. Again, the expansion card 201 is preferably a multi-layer PCB with a standard edge connector 202 with conductive pins 208. The edge connector 202 is adapted for mating with a corresponding connector 204 mounted to the planar 206, where the connector 204 includes internal conductive pins 210 for electrically interfacing the pins 208 of the edge connector 202. Again, the general function of the pins are denoted by letters G for ground, P for power and D for data. Conductive plates 218 and 220 are mounted on the next inner layer of the PCB of the expansion card 201 in a similar manner as described previously for the plate 118, although they could be fashioned according to the plate 120 if desired. The plates 218, 220 include slanted edges 219, 221 in a similar manner as described previously. However, the plates 218, 220 are connected to ground pins of the edge connector 202. In this manner, once the ground pins of the expansion card 201 contact the ground pins of the connector 204, a ground loop is established and capacitive coupling develops between the plates 218, 220 and pins 212, 220, respectively.

The pins 212, 214 of the connector 204 are connected to the respective inputs of Schmitt trigger inverters 222, 228, which are connected to feedback resistors 226, 230, respectively, in a similar manner as described above. The outputs of the inverters 222, 228 are provided to a processor 224 of the computer system. The processor 224 again monitors the respective frequencies of the inverters 222 and 228 and indicates desired functions to a control circuit 232, implemented in a similar manner as the control circuit 132.

The +5V power signal of the planar 206 is not connected directly to the power pins of the connector 204, but is instead connected through an optional insertion detection circuit 238 to the power pins. The insertion detection circuit 238 is preferably a current detect circuit whereas the insertion detection circuit 138 is preferably a voltage detect circuit. The insertion detection circuit 238 asserts a signal DET to the control circuit 232 when voltage and/or current flow is detected. A FET 234 has its current path (drain to source) connected in parallel with the insertion detection circuit 238 and is controlled through its gate by the control circuit 232 to activate/de-activate the FET 234. The FET 234 also provides a high impedance path between the +5V signal and the power pins when de-activated or turned off. Again, one or more similar FETs connected in parallel could provide the desired isolation depending upon the power requirements of the expansion card 201. The control circuit 232 is preferably coupled to the data pins of the connector 204 for tristating or otherwise isolating these data pins from the remaining circuitry of the planar 206 in a similar manner as described above for the control circuit 132. The control circuit 232 could be connected to the ground and power pins of the connector 204 in an analogous manner as described above for the control circuit 132, but the insertion detection circuit 238 provides the power detect function instead.

Operation of the detection circuit 200 is now described. The detection circuit 200 operates in the similar manner as the detection circuit 100, except that the detection circuit 200 is assumed to be powered on even when the expansion card 201 is disconnected from the connector 204. The control circuit 232 maintains the data pins 210 of the connector 204 in tristate condition while the expression card 201 is not plugged in to the connector 204. Furthermore, the insertion detection circuit 238 provides an electrical path between the +5V signal and the power pins of the connector 204, where this path is preferably a high impedance path. The inverters 222, 228 oscillate at a relatively high frequency, such as approximately 1.43 MHz, which is continuously monitored by the processor 224. Since the power and data pins of the connector 204 are tristated or otherwise isolated, insertion of the expansion card 201 has little electrical effect when plugged in, and thus does not cause any power surges and/or data glitches.

It is noted that the ground pins of the edge connector 202 must be contacting the corresponding ground pins of the connector 204 before capacitive loading occurs on the plates 218, 220. Thus, the insertion detection circuit 238 is one means for detecting the expansion card 201 initially being plugged in. The expansion card 201 attempts to draw power through corresponding power pins of the connector 204, causing a slight current drain through the insertion detection circuit 238. The insertion detection circuit 238 correspondingly asserts the DET signal to the control circuit 232. Furthermore, when the ground pins of both connectors 202, 204 are fully connected, capacitive coupling occurs between the plates 218, 220 and the pins 212, 214, respectively, causing frequency changes of the inverters 222, 228. In this manner, either the control circuit 232 or the processor 224, or both may be used to detect the insertion of the expansion card 201.

The processor 224 determines that the expansion card 201 is fully inserted when both inverters 222 and 228 are oscillating at or near a predetermined frequency level, such as less than 100 kHz, or if the frequency of one or both inverters 222, 228 shift by a certain amount. After being fully inserted, the control circuit 232 activates the FET 234 to bypass the insertion detection circuit 238, thereby enabling the +5V signal to provide power to the expansion card 201. Also, the control circuit 232 releases the data pins of the connector 204 to allow communication between the expansion card 201 and the circuitry of the planar 206. It is noted that the insertion detection circuit 238 is optional and not needed for purposes of the present invention since the processor 224 and the inverters 222, 228 are powered and serve to detect insertion of the expansion card 201. In fact, it is desired that power and data isolation remain in effect until the processor 224 determines that the expansion card is fully inserted, which is determined from the frequencies of the inverters 222, 228. The processor 224 then indicates to the control circuit 232 that the expansion card 201 is fully inserted.

When the user begins to remove the expansion card 201, the capacitive plates 218, 220 move with respect to the pins 212, 214, respectively, thereby changing the capacitive loading applied to the inputs of the inverters 222, 228. This causes a substantial increase in frequency of the inverters 222, 228, which is detected by the processor 224 in a similar manner as described previously. Such substantial change in frequency occurs prior to any of the pins of the edge connector 202 being disconnected from the corresponding pins of the connector 204 in a similar manner as described for FIG. 1. When the frequency of either or both of the inverters 222, 228 change by a predetermined amount, such as by a factor of 10 corresponding to a frequency of 400–500 kHz, the processor 224 determines that the expansion card 201 is being pulled. The processor 224 informs the control circuit 232, which correspondingly performs any desired predetermined shutdown procedures. Then, the control circuit 232 tristates the data pins of the connector 204. Also, control circuit 232 turns off the FET 234, thereby isolating the power pins and removing power from the expansion card 201. In this manner, the pins of the connector 204 are isolated prior to disconnection of the pins 208 of the edge connector 202 from the corresponding pins 210 of the connector 204. This results in smooth electrical transition thereby avoiding significant power drain or surges and/or data glitches.

Again, many design variations are possible for the detection circuit 200 as described above for the detection circuit 100. For example, one or both of the capacitive plates 218, 220 may be mounted on the surface of the connector 202 and between connector pins. The control circuit 232 may power up the expansion card 201 in any desired fashion including a controlled ramp function for smooth electrical transition. The processor 224 may detect certain frequency values or certain frequency shifts to determine insertion and/or removal. Slight experimentation may be necessary to determine frequency ranges in any particular logic. Furthermore, fuzzy logic techniques could be implemented by separate logic or within the processor 224 to learn the frequency ranges and other parameters to determine insertion and removal of the expansion card 201. Any of these variations are considered to be within the scope of the present invention.

Figure 3:
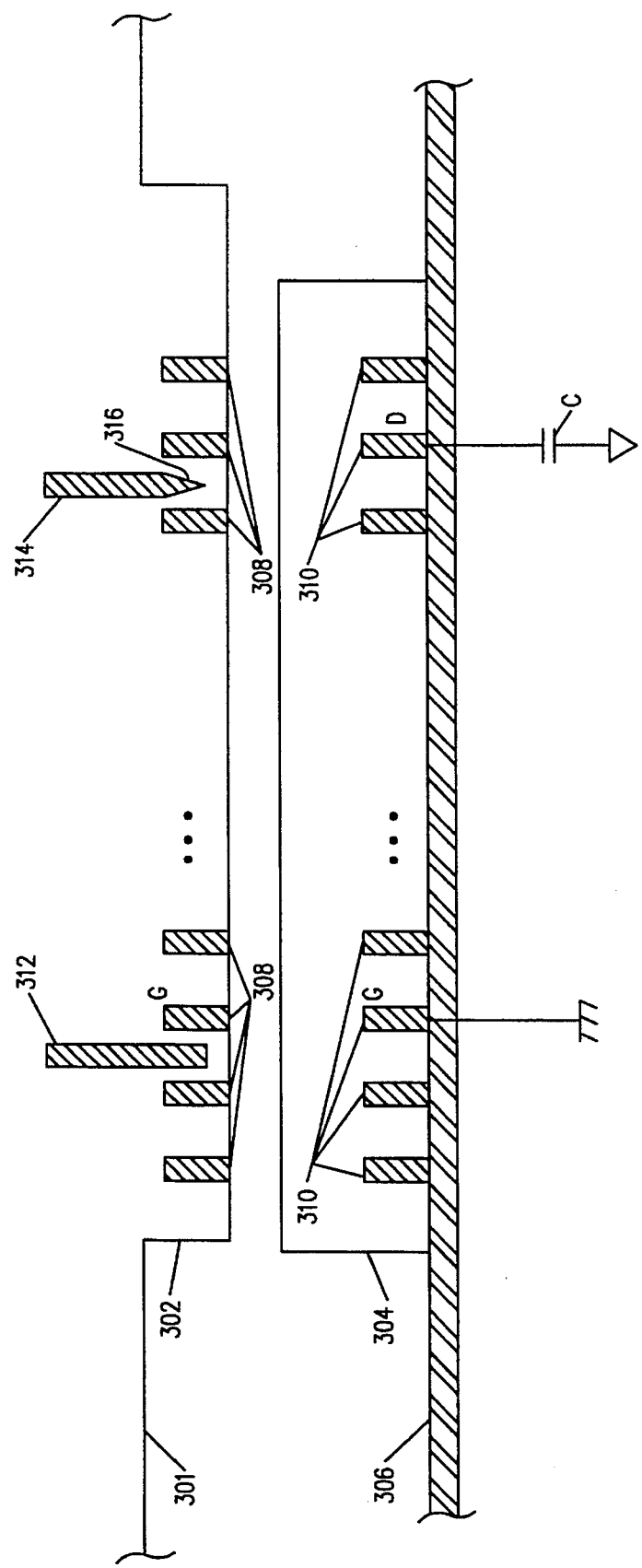
FIG. 3 is a partial side view showing one possible variation of the present invention for use in the embodiments shown in FIGS. 1 and 2.

FIG. 3 is a partial side view of an expansion card 301 including an edge connector 302 with conductive pins 308 for interfacing corresponding pins 310 on an I/O connector 304 mounted to a planar 306. Capacitive plates 312 and 314 are provided in between adjacent ones of the pins 308. The plates 312, 314 could be etched on the next internal layer as described previously or even etched on the surface of the connector 302, thus being coplanar with the pins 308 in the latter case. If coplanar, the plates 312, 314 should be implemented to reduce possible connection with the corresponding pins 310 during insertion and removal. The plate 312 is implemented as a rectangular plate without a slanted edge and plate 314 includes two slanted edges forming a pointed end 316, to illustrate possible variations. The embodiments of FIG. 3 illustrates variations of the capacitive plates, where the remaining detection circuitry is implemented on the expansion card 301 or the planar 306 as described in the embodiments of FIGS. 1 and 2, respectively.

It is now appreciated that detection of insertion or removal of option cards having a standard edge connector according to the present invention allows smooth electrical transition when hot-swapping expansion cards of a powered computer while powered on. The present invention includes at least one variable frequency oscillator having a frequency which varies with capacitive loading applied at its input. Preferably, two such oscillators are provided for detecting capacitive loading on either end of the connector to detect possible pivotal movement. Capacitive loading is facilitated through parallel capacitive plates mounted on the next adjacent layer of the PCB of the expansion card or even coplanar and between adjacent pins of the expansion card.

The capacitive plates preferably include a slanted edge and are aligned with corresponding pins of the I/O connector to thereby increase the change of capacitance with movement of the expansion card relative to the planar. The use of capacitive loading plates and the detection circuitry according to the present invention allows the use of standard card edge and I/O connectors which need not be modified to facilitate detection. In this manner, significant cost of connector modification is avoided.

The detection circuitry may be mounted on the expansion card or on the planar. If on the expansion card, the power and data pins of the expansion card are tristated in the power down state. Thus, insertion of the expansion card into the planar avoids initial power drains or surges and also avoids data glitches which might otherwise affect the computer system and/or other expansion cards plugged into adjacent slots of the I/O bus. Once power is detected to the expansion card when fully inserted, control circuitry activates power, preferably in a controlled fashion and then removes the tristate condition to enable the expansion card to power up and operate normally. During operation, a processor on the expansion card monitors the frequency of the oscillators and detects removal when the frequency of one or both of the oscillators reaches a particular frequency or changes by a predetermined amount. The processor then asserts a signal to the control circuitry which correspondingly performs required procedures for powering down the expansion card and tristating data pins prior to disconnection.

If the detection circuitry is located on the planar, it has the advantage of being powered on. The power and data pins of the I/O connector mounted to the planar are initially tristated to prevent power surges and data glitches upon insertion of an expansion card. The capacitive plates are provided on the expansion card as before, but coupled to the ground pins. The oscillators are connected to corresponding pins on the I/O connectors, which sense the capacitive plates when the expansion card is being inserted. Preferably, the card is considered fully inserted when both oscillators are oscillating at a certain frequency level indicating full capacitive loading, although a certain frequency shift is also contemplated. Control circuitry then enables power in a controlled fashion and removes the tristate condition from the data pins to thereby allow normal operation.

When the expansion card is being removed, the frequency of the oscillators change as detected by the processor on the planar. The processor then informs the control circuit which orchestrates power down by peribrining any desired shutdown procedures, and then tristates the data pins and isolates the power pins. Again, this results in electrical transition when the pins of the expansion card are disconnected from the pins of the I/O connector.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A detection system for detecting the insertion and removal of an expansion card relative to an I/O connector of a computer system, the expansion card including a connector having a plurality of conductive pins for interfacing corresponding pins of the I/O connector, said detection system comprising:

a conductive plate for mounting to the expansion card to capacitively interface a corresponding pin on the I/O connector, wherein capacitive coupling develops between said plate and said corresponding pin which changes as the expansion card is moved relative to the I/O connector;

an oscillator coupled to said capacitive coupling between said plate and said corresponding pin, wherein said oscillator has a frequency which varies with changes of said capacitive coupling; and a processor coupled to said oscillator for detecting movement of the expansion card through changes of said frequency.

2. The detection system of claim 1, wherein said oscillator comprises:

an inverter having a relatively high impedance input coupled to detect said capacitive coupling; and a feedback resistor coupled between the input and output of said inverter.

3. The detection system of claim 2, wherein said inverter is a CMOS Schmitt trigger inverter.

4. The detection system of claim 1, wherein said capacitive coupling increases as the expansion card is inserted into the I/O connector and decreases as the expansion card is removed.

5. The detection system of claim 1, wherein said conductive plate has a slanted edge to increase the change of said capacitive coupling as the expansion card is being inserted or removed.

6. The detection system of claim 1, wherein the expansion card is a multilayer printed circuit board, wherein said conductive plate is mounted on an inner layer of the printed circuit board at a position for alignment with said corresponding pin.

7. The detection system of claim 1, wherein said conductive plate is implemented between two respective pins of the expansion card.

8. The detection system of claim 1, wherein said plurality of conductive pins of the expansion card and the I/O connector include power, ground and data pins, further comprising:

an isolation circuit coupled to said processor for electrically isolating said data and power pins of the expansion card or the I/O connector until said processor detects the expansion card plugged into the I/O connector, wherein said isolation circuit electrically couples said data and power pins.

9. The detection system of claim 8, wherein said processor indicates that the expansion card is being removed from the I/O connector if said frequency of said oscillator reaches a predetermined frequency, wherein said isolation circuit respondingly electrically isolates said data and power pins before the expansion card is fully removed from the I/O connector.

10. The detection system of claim 1, wherein said processor determines that the expansion card is inserted into the I/O connector when said oscillator is oscillating at a predetermined frequency.

11. The detection system of claim 1, wherein said processor detects insertion and removal of the expansion card when the frequency of said oscillator shifts by a predetermined amount.

12. A detection system for detecting the insertion and removal of an expansion card relative to an I/O connector of a computer system, the I/O connector including a plurality of conductive pins, said detection system comprising:

an expansion card including an edge connector having a plurality of conductive pins for interfacing corresponding conductive pins of the I/O connector;

a first conductive plate mounted on one end of said edge connector for capacitively interfacing a first pin of the I/O connector;

a second conductive plate mounted on the opposite end of said edge connector for capacitively interfacing a second pin of the I/O connector;

a first oscillator coupled to detect capacitive coupling of said first plate, said first oscillator oscillating at a frequency which varies with changes of capacitance between said first plate and said first pin;

a second oscillator coupled to detect capacitive coupling of said second plate, said second oscillator oscillating at a frequency which varies with changes of capacitance between said second plate and said second pin; and a processor coupled to detect said frequencies of said first and second oscillators for detecting said expansion card being inserted or removed.

13. The detection system of claim 12, wherein said processor determines that said expansion card is fully inserted when said first and second oscillators are both oscillating below a predetermined frequency.

14. The detection system of claim 12, wherein said processor determines that said expansion card is being removed when either one or both of said first and second oscillators is oscillating above a predetermined frequency.

15. The detection circuitry of claim 12, wherein said processor determines that said expansion card is being inserted or removed based on a frequency shift of both said first and second oscillators.

16. The detection system of claim 12, wherein said first and second plates each have a slanted edge to increase the change of said capacitance while said expansion card is being inserted into or removed from the I/O connector.

17. The detection system of claim 12, wherein said first and second oscillators and said processor are implemented on said expansion card, wherein said first plate is coupled to an input of said first oscillator and wherein said second plate is coupled to an input of said second oscillator.

18. The detection system of claim 17, wherein said first and second pins of the I/O connector are connected to ground.

19. The detection system of claim 17, wherein at least one of said first and second pins of the I/O connector is a data pin, further comprising:

a capacitor coupled between said data pin and ground.

20. The detection system of claim 17, wherein said plurality of conductive pins of said expansion card include power, data and ground pins, further comprising:

a control circuit coupled to said processor for electrically isolating said power and data pins of said expansion card before being inserted into and while being removed from the I/O connector.

21. The detection system of claim 20, further comprising:

a current detect circuit coupled between said power and ground pins of said expansion card for detecting current and providing a detect signal indicative thereof; and said control circuit receiving said detect signal and responsively connecting said power and data pins of said expansion card, said control circuit electrically isolating said power and data pins when said processor indicates that said expansion card is being removed.

22. The detection system of claim 21, wherein said control circuit connects said power pins first upon receiving said detect signal and connects said data pins after said processor indicates that both of said first and second oscillators are oscillating at a frequency below a predetermined frequency, and wherein said processor indicates that said expansion card is being removed when the frequency of either one of said first and second oscillators rises above said predetermined frequency.

23. The detection system of claim 12, wherein the I/O connector is mounted to a planar of the computer system, comprising:

said plurality of pins of said expansion card and the I/O connector including power, ground and data pins;

said first and second plates being electrically connected to ground pins of said expansion card; and said first and second oscillators being implemented on the planar of the computer system, said first oscillator having an input coupled to said first pin of the I/O connector and said second oscillator having an input coupled to said second pin of the I/O connector.

24. The detection system of claim 23, further comprising:

a control circuit implemented on the planar for isolating said power and data pins of the I/O connector from circuitry on the planar.

25. The detection system of claim 24, wherein said processor indicates that said expansion card is fully inserted when the frequencies of said first and second oscillators are both below a predetermined frequency, and wherein said control circuit respondingly connects said power and data pins to provide power and allow communication with said expansion card.

26. The detection system of claim 24, wherein said processor indicates that said expansion card is being removed when the frequency of either one or both of said first and second oscillators is above said predetermined frequency, wherein said control circuit respondingly electrically isolates said power and data pins.

27. The detection system of claim 26, wherein said control circuit includes a field-effect transistor for isolating said power pins of the I/O connector.

28. The detection system of claim 12, wherein said expansion card comprises a multilayer printed circuit board, and wherein said first and second conductive plates are implemented on an internal layer of said printed circuit board at location corresponding to said first and second pins of the I/O connector, respectively.

* * * * *